United States Patent [19]
Sutton

[11] 3,806,204
[45] Apr. 23, 1974

[54] ANTI-SKID BRAKING SYSTEMS
[76] Inventor: Christopher John Sutton, 1, Launceston Close, Belgrave, Tamworth, Staffordshire, England
[22] Filed: July 29, 1971
[21] Appl. No.: 167,422

[30] Foreign Application Priority Data
Sept. 9, 1970 Great Britain.................. 43115/70

[52] U.S. Cl............................. 303/21 BE, 303/20
[51] Int. Cl.............................................. B60t 8/12
[58] Field of Search..... 188/18 A; 244/111; 303/20, 303/21; 324/162; 340/262

[56] References Cited
UNITED STATES PATENTS
| | | | |
|---|---|---|---|
| 3,597,011 | 8/1971 | Clifford | 303/21 BE |
| 3,017,146 | 1/1962 | Yarber | 303/21 P X |
| 3,275,384 | 9/1966 | Hirzel | 303/21 CG UX |
| 3,653,726 | 4/1972 | Wakamatsu et al. | 303/21 CG |
| 3,615,120 | 10/1971 | Yamazaki et al. | 303/21 BE |
| 3,652,132 | 3/1972 | Ando et al. | 303/21 CG |
| 3,671,083 | 6/1972 | Matsumura | 303/21 BE |
| 3,604,761 | 9/1971 | Okamoto et al. | 303/21 CG |

FOREIGN PATENTS OR APPLICATIONS
1,810,163 7/1970 Germany...................... 303/21 BE Primary Examiner—George E. A. Halvosa
Assistant Examiner—Stephen G. Kunin
Attorney, Agent, or Firm—Holman & Stern

[57] ABSTRACT

An anti-skid braking system has a generator driven by a wheel of the vehicle for producing an alternating output with a frequency proportional to wheel speed. This signal is converted to a voltage level and differentiated to produce a signal representing deceleration. A control circuit modifies the brake pressure in accordance with the output from the differentiating circuit to minimise risk of locking of the wheel, and a capacitor which is charged by the output from the differentiating circuit is connected to the control circuit. This capacitor has a permanent discharge path and the control circuit responds to the capacitor voltage or the output from the differentiating circuit, which ever is higher. The overall effect is that the braking pressure is increased more rapidly on a good road surface than a bad road surface.

1 Claim, 1 Drawing Figure

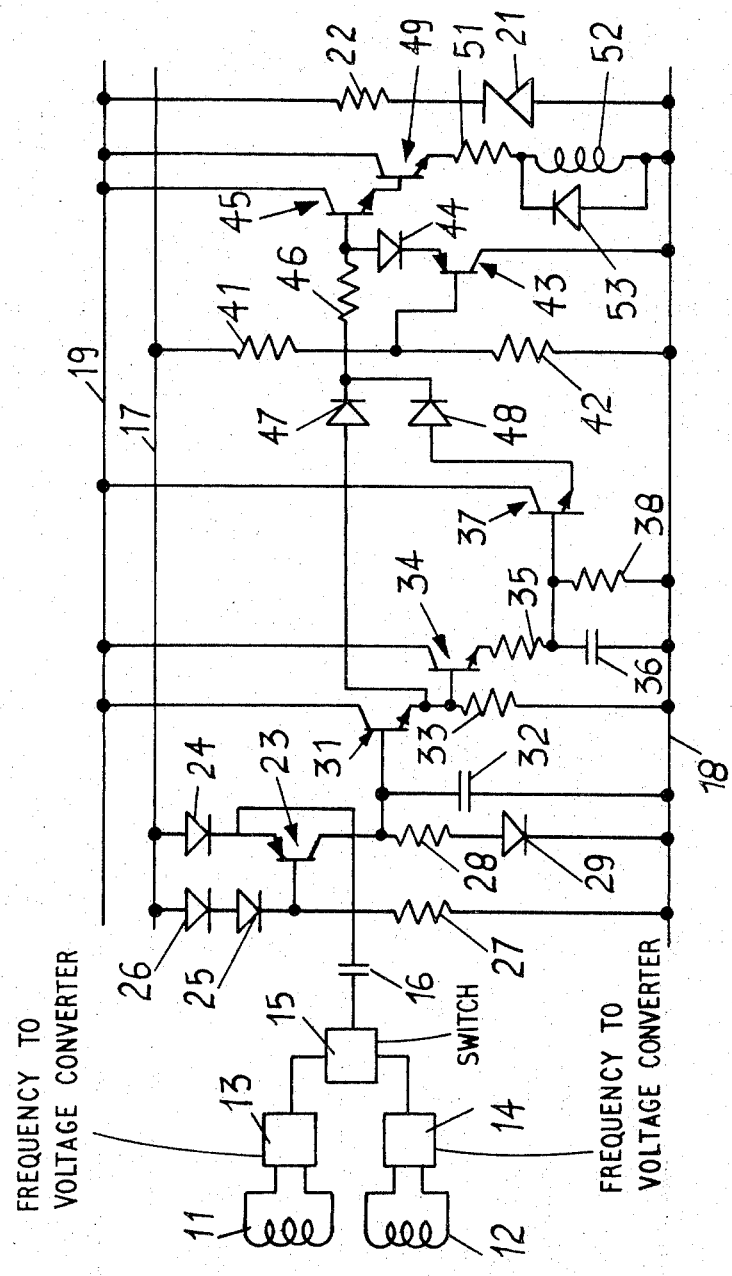

ANTI-SKID BRAKING SYSTEMS

This invention relates to anti-skid braking systems for vehicles, in particular road vehicles.

A system according to the invention comprises in combination a generator driven by a wheel of the vehicle for producing an alternating output with a frequency proportional to wheel speed, a frequency to voltage converter for converting the signal to a voltage level representing wheel speed, a differentiating circuit to which the signal is applied, the differentiating circuit producing an output representing the deceleration of the wheel, a control circuit for modifying the braking pressure in accordance with the output from the differentiating circuit to minimise risk of locking of the wheel, a capacitor which is charged by the output from the differentiating circuit, a permanent discharged path for said capacitor, and means coupling the capacitor to the control circuit whereby the control circuit responds to the capacitor voltage or the output from the differentiating circuit, whichever is higher, the arrangement being such that braking pressure is increased more rapidly on a good road surface than a bad road surface.

The accompanying drawing is a circuit diagram illustrating one example of the invention.

Referring to the drawing, a pair of wheels on a common axle each has associated therewith a generator for producing in a pick-up winding an alternating signal at a frequency representing the wheel speed. The two windings are shown at 11 and 12, and are connected to a pair of frequency to voltage converters 13, 14 respectively, the outputs from the converters 13, 14 being connected by way of a switch 15 to one plate of a capacitor 16. The switch 15 passes to the capacitor 16 a signal from which ever wheel is rotating most slowly, that is to say the wheel which is most likely to slip.

The converters 13 and 14 are powered from positive and negative supply lines 17, 18, and a further positive supply line 19 is provided, the voltage on the line 19 being stabilised by a Zener diode 21 connected in series with the resistor 22 between the lines 18, 19. The capacitor 16 is connected to the emitter of a p-n-p transistor 23, the emitter of which is further connected to the line 17 through a diode 24, and the base of which is connected to the line 17 through a pair of diodes 25, 26 in series, and to the line 18 through a resistor 27. The collector of the transistor 23 is connected to the line 18 through a resistor 28 and a diode 29 in series, and is further connected to the base of an n-p-n transistor 31, the base of which is also connected through a capacitor 32 to the line 18, and the collector of which is connected to the line 19. The emitter of the transistor 31 is connected through a resistor 33 to the line 18, and is also connected to the base of an n-p-n transistor 34 having its collector connected to the line 19 and its emitter connected to the line 18 through a resistor 35 and a capacitor 36 in series. The junction of the resistor 35 and capacitor 36 is connected to the base of an n-p-n transistor 37, the base being further connected to the line 18 through a resistor 38, and the collector of the transistor 37 being connected to the line 19.

Connected in series between the lines 17, 18 are a pair of resistors 41, 42 the junction of which is connected to the base of a p-n-p transistor 43 having its collector connected to the line 18 and its emitter connected through a diode 44 to the base of an n-p-n transistor 45. The base of the transistor 45 is further connected to one end of a resistor 46, and the other end of the resistor 46 is connected through diodes 47 and 48 respectively to the emitter of the transistors 31 and 37.

The transistor 45 has its collector connected to the line 19 and its emitter connected to the base of an n-p-n transistor 49, the collector of which is connected to the line 19, and the emitter of which is connected through a resistor 51 and a moving coil valve 52 in series to the line 18, the valve 52 being bridged by a diode 53.

In use, which ever of the converters 13,14 is selected by the switch 15 will pass to the capacitor 16 a voltage representing the speed of the wheel. The capacitor 6 together with the transistor 23 and its associated components constitute a differentiating circuit for charging the capacitor 32 to a voltage representing deceleration of the wheel, the purpose of the diodes 24,25,26 being to provide temperature compensation. Ignoring for the moment the transistor 34, capacitor 36 and their associated components, the transistor 31 is turned on by the differentiating signal, so that its conduction is determined by the deceleration of the wheel. The current flowing through the transistor 31 passes by way of the diode 47 to the base of the transistor 45, and the amplifier 45,49 provides an amplified current to the valve 52, it being appreciated that the current flowing in the valve 52 will be dependent on the deceleration of the wheel. When the valve 52 is energised, it modifies the braking pressure, and the greater the current flowing through the solenoid 52, the more braking pressure is released, so that risk of wheel skid is minimised.

When the transistor 31 conducts as a result of a wheel decelerating, it also turns on the transistor 34, which charges the capacitor 36. The capacitor 36 can discharge permanently through the resistor 38, and assuming the brakes are applied on a good road surface, the deceleration will not be too rapid, and the capacitor 36 will charge to a relatively low voltage. The braking pressure is now modified by the current flowing through the resistor 47, so that the deceleration becomes less rapid, but the capacitor 36 discharges through the resistor 38 and plays no part in the operation of the circuit. However, on a bad road surface, when the brakes are applied the deceleration will be far more rapid, and the capacitor 36 will charge to a much higher voltage. The braking pressure is modified as before, but when the wheel starts to accelerate again because the braking pressure has been relieved, the capacitor 36 will now have had time to discharge as much as on a good road surface, and so the transistor 37 will conduct and current will flow through the diode 48 to the transistor 45. This current will be greater than current flowing through the diode 47, but the amplifier 45, 49 will respond in just the same way as if a deceleration signal was received, and will continue to relieve the braking pressure. Thus, on a bad road surface the relief of braking pressure is maintained for longer than on a good road surface.

The transistor 43 protects the valve 52 from excessive voltage, and limits the amount by which the brakes can be released to match the capacity of the servo mechanism.

I claim

1. An anti-skid braking system for a vehicle, comprising in combination a generator driven by a wheel of the vehicle for producing an alternating output with a frequency proportional to wheel speed, a frequency to voltage converter for converting the signal to a voltage level representing wheel speed, a differentiating circuit to which the signal is applied, the differentiating circuit producing an output representing the deceleration of the wheel, a transistor coupled to the output of said differentiating circuit, the conduction level of said transistor being determined by the differentiating circuit output, a control circuit, a first diode coupling the output of said transistor to said control circuit, the control circuit modifying the braking pressure in accordance with the output from the transistor to minimise risk of locking of the wheel, a capacitor which is charged by the output from the differentiating circuit, a permanent discharge path for said capacitor which is charged by the output from the differentiating circuit, a permanent discharge path for said capacitor, and means including a second diode coupling the capacitor to the control circuit whereby the control circuit responds to the capacitor voltage or the output from the differentiating circuit, which ever is higher, the arrangement being such that braking pressure is increased more rapidly on a good road surface than a bad road surface.

* * * * *